United States Patent
DeCaro et al.

(10) Patent No.: US 6,191,872 B1
(45) Date of Patent: Feb. 20, 2001

(54) ILLUMINATOR WITH LIGHT SOURCE ARRAYS

(75) Inventors: Joel D. DeCaro, Brockport; Mark E. Shafer, Fairport, both of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 08/979,890

(22) Filed: Nov. 26, 1997

(51) Int. Cl.[7] ....................................... H04N 1/46
(52) U.S. Cl. ..................... 358/509; 358/505; 358/512
(58) Field of Search .................................. 358/475, 505, 358/512, 514, 515, 509, 506, 487, 1.9; 348/268, 269, 270, 271, 272; 361/800

(56) References Cited

U.S. PATENT DOCUMENTS

| | | | |
|---|---|---|---|
| 5,012,346 | 4/1991 | DeJager et al. | 348/97 |
| 5,103,385 | 4/1992 | Federico et al. | 362/298 |
| 5,155,596 | 10/1992 | Kurtz et al. | 348/97 |
| 5,191,406 | 3/1993 | Brandestini et al. | 348/111 |
| 5,241,459 | 8/1993 | Kaplan et al. | 362/298 |
| 5,255,171 | 10/1993 | Clark | 362/231 |
| 5,257,340 | 10/1993 | Kaplan | 385/128 |
| 5,274,228 | 12/1993 | Kaplan | 250/227.31 |
| 5,335,158 | 8/1994 | Kaplan et al. | 362/303 |
| 5,361,158 | 11/1994 | Tang | 359/204 |
| 5,386,267 | 1/1995 | Jones | 355/67 |
| 5,414,489 | 5/1995 | Kaplan | 355/67 |
| 5,442,533 | 8/1995 | Kaplan | 362/303 |
| 5,465,155 | 11/1995 | Edgar | 358/500 |
| 5,465,174 | 11/1995 | Sprotbery | 349/5 |
| 5,502,490 | * 3/1996 | Takanashi et al. | 358/296 |
| 5,548,120 | 8/1996 | Parker et al. | 250/341.7 |
| 5,663,782 | 9/1997 | Saita et al. | 355/37 |
| 5,697,699 | * 12/1997 | Seo et al. | 362/252 |
| 5,982,957 | * 11/1999 | DeCaro et al. | 358/509 |

FOREIGN PATENT DOCUMENTS 1 116 630   5/1989   (JP) .

* cited by examiner

Primary Examiner—Cheukfan Lee
(74) Attorney, Agent, or Firm—Gordon M. Stewart; David A. Novais

(57) ABSTRACT

An illuminator and a scanner incorporating such an illuminator. In one embodiment, the illuminator has a plurality of arrays of semiconductor light emitting elements, each array having a different integrated spectral output, and a plurality of respective different interference filters each positioned between a corresponding array and the media holder. A media holder holds a media carrying an image for scanning, the media holder being positioned to receive filtered light from the illuminator. A sensor is positioned to receive light from the media holder so as to generate an image signal corresponding to an image on a media positioned at the media holder.

28 Claims, 3 Drawing Sheets

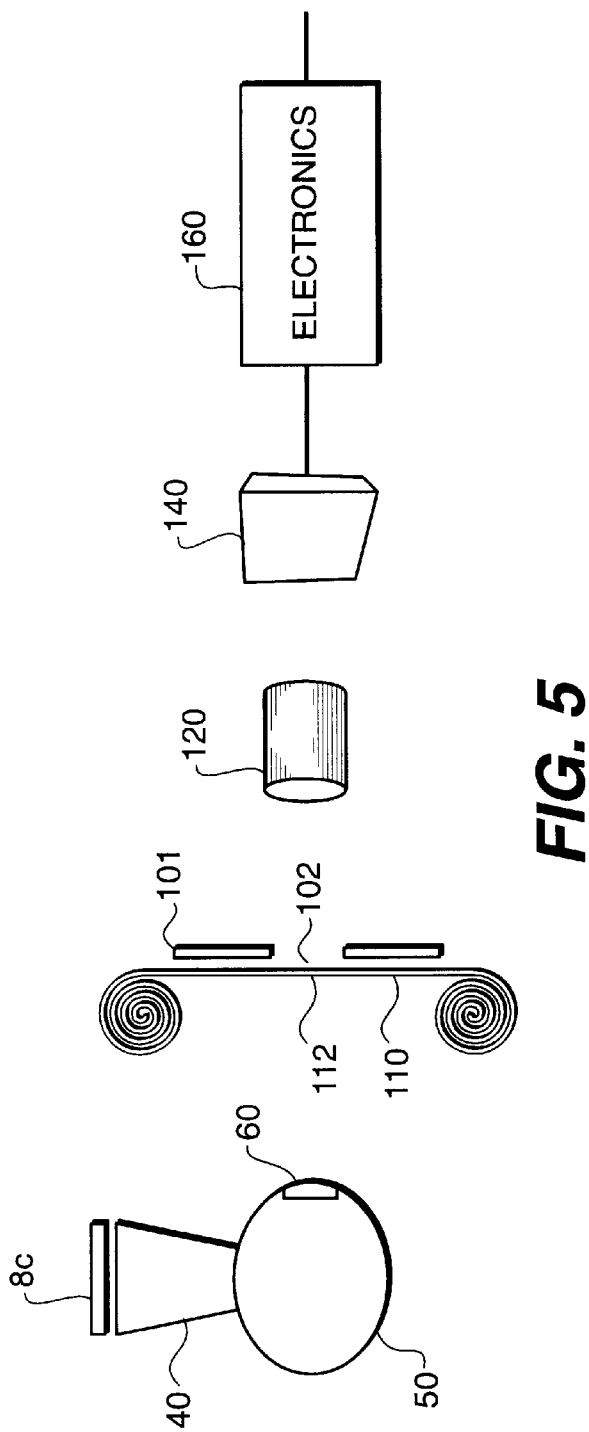

ILLUMINATOR WITH LIGHT SOURCE ARRAYS

FIELD OF THE INVENTION

This invention relates generally to the field of illuminators, and particularly to scanners incorporating such systems.

BACKGROUND OF THE INVENTION

Scanners convert hard copy analog images on a media into digital data. The media can be either transparent (for example, a photographic negative) or reflective (for example, paper). The use of scanners has become widespread for a variety of applications, including storing, manipulating, transmitting and displaying or printing copies of the images. For example, images captured in photographic media can be converted to digital data and stored on compact discs for readout and display as a video image or for printing with various types of color printers. In order to capture the photographic image digitally, an image frame is scanned with light, such as a line of light, and the light transmitted through the image is detected, typically as three primary color light intensity signals, and then digitized. The digitized values may be formatted to a standard for video display and stored on compact disc, magnetic media, or other suitable storage. Scanners take a variety of forms and the various common aspects of film digitizing, particularly line illumination and linear CCD-based digitizers, are described in greater detail in U.S. Pat. No. 5,012,346. For example, in one common type of scanner a one-dimensional sensor (typically referenced as a line sensor or one-dimensional array) is used and the illumination source directs a line of light onto the image bearing media, which is then moved one line at a time to scan the complete image line by line. In another scanner type, a two-dimensional sensor (typically referenced as an area array) is used, and the illumination source illuminates the entire image at the same time, so that the complete image is scanned in a single exposure. Scanners with area arrays are simpler to construct and are often preferred. However, scanners with line sensors provide higher resolution at lower equipment cost.

In order to obtain image signals which accurately represent a scanned image, the illumination source used in a scanner must meet certain requirements. One is that the light must be of sufficiently high intensity. While this can be obtained by used higher powered light sources, this leads to greater heat generation with required means to control such heat, and often to a light source with a shorter life. The illumination source should also provide uniform intensity of illumination so that the signal-to-noise ratio does not vary across the extent of the media being imaged. Although correction to the image signal can be used to remove the effects of such non-uniformity, doing so causes regions of low illumination to be more noisy than regions of high illumination from the higher gain applied there. Additionally, since the media to be illuminated may contain defects such as scratches, it is well known that the visibility of such defects may be reduced by distributing the light angularly at the media over angles of incidence of +45 degrees. This is generally accomplished either by using a diffusing element such as ground glass or a diffuse integrating chamber with or without an optical waveguide in close proximity to the media. Another desirable feature is that it be possible to vary the spectral distribution of light so as to accommodate different media types (e.g. a photographic reflection print, or a photographic negative having an orange colored "mask"). Many of these desirable features (such as intensity and uniformity of illumination, with adjustable spectral distribution) become more difficult to obtain in area array scanners.

It is possible to use as a light source, a broadband, white light source with appropriate filters to remove undesirable spectral components. One such known prior art arrangement is illustrated in FIG. 1. In FIG. 1, an incandescent light bulb 2 is positioned in a reflector 4 to direct light to an interference filter 6 (sometimes referred to as dichroic filters). Interference filter 6 is constructed to reject infra-red (to which a scanner sensor may be sensitive). The filter may also be designed to improve color balance by removing unwanted components of visible light. Such color balancing interference filters are expensive to construct. Light from filter 6 then enters a non-imaging optic concentrator cone 8 and through an input port 11 of a integrating chamber 50. The inside of integrating chamber 50 is made of a diffuse reflective material so that a relatively uniform beam of light enters an exit port 12 toward a media to be scanned, then onto an area array sensor.

The above illumination system is relatively effective. However, it is not possible to readily vary the spectral distribution of light leaving exit port 12 without an expensive color balance interference filter or other complex arrangements providing for different filters (for example, a filter wheel). Furthermore, a substantial proportion of light from bulb 2 will impinge upon interference filter 6 at different angles. Since the actual filtration of light by an interference filter is dependent upon the angle of incidence of the light to be filtered, with respect to the filter, this can result in different spectral outputs at different regions of interference filter 6, and hence lack of uniformity of filtered light. However, in the case of FIG. 1 this is not critical since interference filter 6 is only provided to broadly cut-off undesired infra-red. U.S. Pat. No. 5,191,406 discloses a line scanner in which lines of differently colored light emitting diodes (LEDs) are used to provide lines of illumination of different colors. The relative ON times of the different colored LEDs may be adjusted to provide a desired total spectral distribution for each line. However, the spectrum of a given LED (e.g. a green or red LED) is essentially fixed by LED characteristics. In U.S. Pat. No. 5,191,406 there is no means by which spectra in individual color regions (e.g. red, or green) can be controlled without having to replace the LEDs. Even with LED replacement a desired spectra in a single color channel (such as red, green, or blue) may not be obtainable with existing LEDs. Furthermore, no means is provided for also obtaining a uniform area of light provided for an area array scanner.

It would be desirable then, to provide illumination in an area array scanner, which is of relatively low power consumption, and can provide output spectra in each color channel which is not limited by characteristics of the actual light emitting device, while still maintaining good light uniformity throughout the two-dimensional illumination area.

SUMMARY OF THE INVENTION

The present invention then, provides in one aspect, a scanner comprising an illuminator comprising a plurality of arrays of semiconductor light emitting elements, each array having a different integrated spectral output, and a plurality of respective different interference filters each positional between a corresponding array and the media holder. A media holder to hold a media carrying an image for scanning, is positioned to receive filtered light from the illuminator. A sensor is positioned to receive light from the media holder so as to generate an image signal corresponding to an image on a media positioned at the media holder.

In another aspect, the present invention provides an illuminator comprising a plurality of illumination sources each having a different integrated spectral output. An integrating chamber is positioned to receive light from each of the illumination sources through respective input ports of the chamber, and direct the resulting integrated light through an output port of the chamber. Each of a plurality of interference filters is positioned between a corresponding input port and illumination source. The foregoing illuminator may also be used in a scanner with a media holder of the above type, positioned to receive light from the output port of the integrating chamber. When such concentrators are present, preferably the interference filters are positioned on input sides of the respective concentrators (that is, the side of the concentrator which receives light from the illumination source). In any event, preferably the interference filters are positioned adjacent respective illumination sources (and also preferably adjacent respective input sides of the concentrators). This ensures that the area of the interference filters (and input sides of the concentrators) need not be unduly enlarged. Also, by keeping the input sides of the concentrators of relatively small area, this permits the light output ends of the concentrators to be maintained relatively small (thereby keeping light loss from an integrating chamber back through the concentrator, relatively low).

The illuminators of the present invention, can provide illumination to a scanner with a finely controllable total output spectra to the scanner. This is possible by controlling relative intensity or ON time of the illumination sources and/or any of a plurality of light emitting elements of each illumination source, as well as by finely tuning the overall spectral distribution from each illumination source by means of readily constructed interference filters with the required filtration properties. However, it is best to control only the ON time, since changes in LED drive current, tend to change the spectral distribution of emitted light. Low light losses and therefore high efficiency, are promoted by the positioning of the interference filters adjacent an illumination source of multiple light emitting elements since the angle of incidence of light reaching the interference filter is kept low. The use of interference filters between each illumination source and a corresponding inlet port of an integrating chamber, helps reduce light losses from the chamber by reflecting light from other of the illumination sources back into the chamber (that is, for a given illumination source the input ports for the other illumination sources will be made to appear more reflective).

BRIEF DESCRIPTION OF THE DRAWINGS

FIG. 5 illustrates a scanner of the present invention; and

FIG. 6A, 6B, and 6C illustrate transverse cross-sections of a concentrator taken along lines 6A—6A, 6B—6B, and 6C—6C, respectively of FIG. 2.

To facilitate understanding, identical reference numerals have been used, where possible, to designate identical elements that are common to the figures.

DETAILED DESCRIPTION OF THE INVENTION

Figure 2:
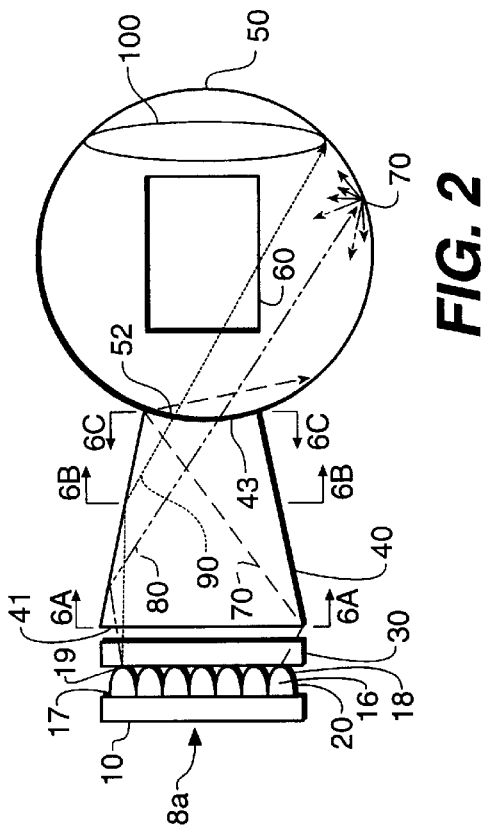
FIG. 2 is a cross-section through an illuminator of the present invention showing only a single channel for simplicity.
Figure 1:
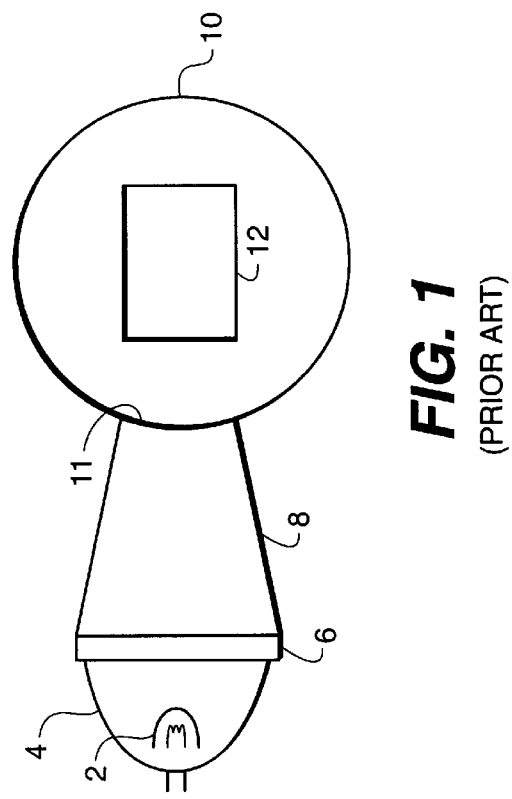
FIG. 1 is a cross-section through a prior art illuminator used in a scanner.
Figure 4:
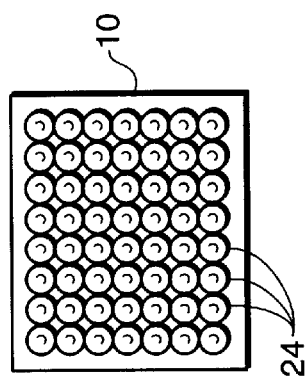
FIG. 4 is a front elevation of one of the illumination sources in the illuminator of FIG. 3.

Referring first to FIG. 2, this illustrates a typical single channel of an illuminator of the present invention. The illuminator includes an illumination source 8a in the form of a two-dimensional array of semiconducting light emitting elements, specifically LEDs 20, which are mounted on a printed circuit board 10. Board 10 also acts as a heatsink. Each LED 20 may typically emits light near a central portion 16 which is midway between a base 17 abutting board 10, and a front 19 of a condensing convex lens 18. The entire package between and including, base 17 and lens 18, is preferably clear (that is, not colored). Lens 18 acts as a condenser lens, that is it collects light emitted by the light emitting central portion 16 and decreases the divergence angle of such light (including either focussing the light to a point or collimating the light). LEDs 20 may be the same to provide identical light output spectra, or may be different. Thus, the spectrum of the total light emitted from illumination source 8a (sometimes referenced as the integrated spectrum) can be adjusted as desired by selecting appropriate LEDs. An interference filter 30 is positioned immediately adjacent lenses 18 of LEDs, and adjacent the actual light emitting central portion 16 (by "adjacent" in this application is referenced, unless a contrary intention appears, within about 10 millimeters ("mm"), and more preferably within about 5 mm). Interference filters pass only the desired wavelengths of light and reflect others. A concentrator cone 40, in the form of a non-imaging optics cone, has a light inlet end 41 positioned adjacent the corresponding interference filter 30, and a light outlet end 43 positioned at a light input port 52 of an integrating chamber 50. Integrating chamber 50 has a generally square or rectangular light output port 60 centered about an imaging optical axis which is perpendicular to an axis of cone 40. Any concentrator cone 40, as well as light integrating chamber 50, can be hollow or solid, as is known.

Each of cones 40 has a compound elliptical configuration. This can be seen more clearly in FIGS. 6A–6C. FIG. 6A is viewed along the lien 6A—6A in FIG. 2, and illustrates that the light inlet in a cone 40 is elliptical with its major axis along the line 6A—6A of FIG. 2. In the middle of cone 40 the cross-section is that of FIG. 6B as viewed along the line 6B—6B of FIG. 2 (that is, the cross-section at this position is circular). At the light outlet opening of cone 40, the cross-section is that of FIG. 6C, namely elliptical with its minor axis along the line 6C—6C of FIG. 2. By using such elliptical configurations, three benefits can be realized. First, minimum linear packing density of 5 mm LED packages with auto-insertion equipment is not equal in the two dimensions of the circuit board (5.8 mm and 6.33 mm pitches). This drives the need to arrange the LEDs into an elliptical array. Second, it is desirable that the highly non-uniform light from a single specular reflection within the cone not fall on the back of the diffusion chamber where it might be imaged as a "hot spot". This reduces the cone angle/concentration ratio for the dimension from front to back (front being defined as the side with the output port) of the chamber. Finally, a higher cone angle/concentration ratio can be tolerated along the dimension of the plane bisecting the chamber and perpendicular to the imaging optical axis.

Integrating chamber 50 is preferably of an prolate spheroid shape. That is, a sphere which has one axis elongated (in the present case, the elongation being along the imaging optical axis). An oblate spheroid is formed by rotating an ellipse about its major axis, which in this case will be aligned with the imaging optical axis. Thus, chamber 50 has a circular cross-section in the views shown in FIGS. 2 and 3 and elliptical in the view shown in FIG. 5.

In operation, light from illumination source 8a will then pass through corresponding interference filter 30 where the unwanted spectral components are reflected in a known manner. The transmitted light is then reflected specularly within the concentrator 40, which has been designed to project light entering input port 52, against an inside surface portion delimited by a circumference 100 in the integrating chamber 50. This intense, non-uniform distribution is outside of the field of view of the imaging system through the single output port 60. Higher angle light 80 emitted from the LEDs may fall outside of the circumference 100 but is less intense because the angular distribution from the lamp falls off rapidly due to the highly directive packaging (specifically, lenses 18). Even higher angle and further less intense light such as may fall at position 70 may undergo two reflections in the concentrator before striking the interior of the chamber again out of view of the imaging system. Because of the many subsequent reflections from the diffuse interior surface of the light distribution viewed through the output port 60 by the imaging system achieves a high degree of uniformity. Integrating chamber 50 then, will provide at least two diffuse light reflections for the majority of light entering the integrating chamber through each input port 52 before such light exits output port 60.

Figure 3:
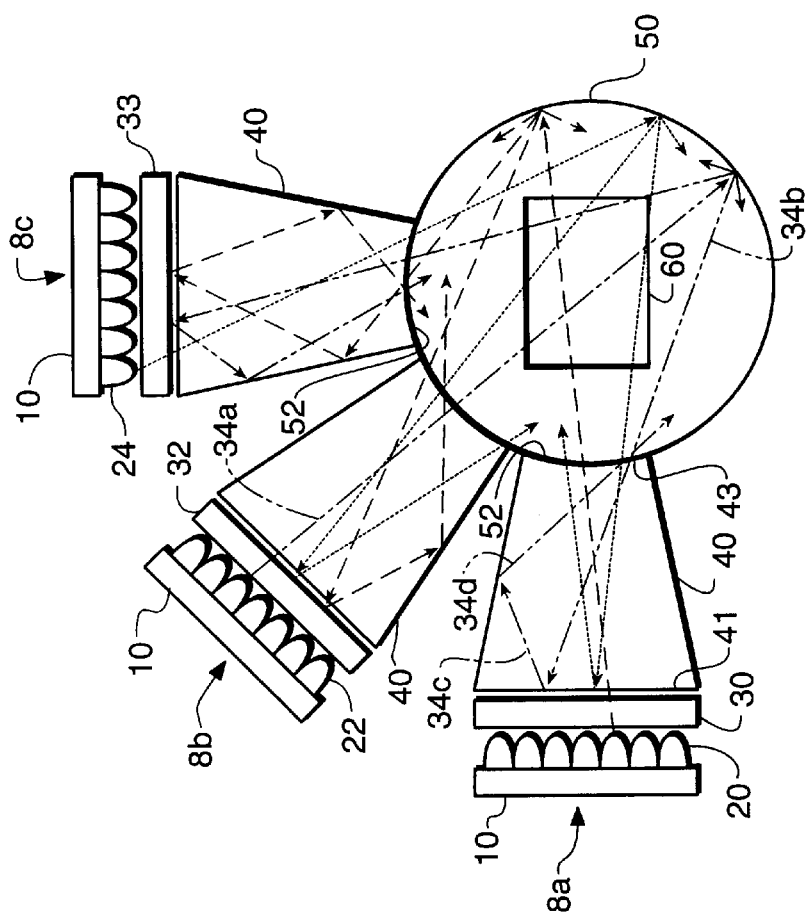
FIG. 3 is a cross-section through a complete illuminator of the present invention, illustrating light paths and reduction in light losses achievable.

Referring now to FIG. 3, the complete illuminator of the present invention is fully illustrated. In FIG. 3, each illumination source 8a, 8b, 8c has a different set of LEDs. For example, LEDs 20 could primarily (or completely) be identical green light emitting LEDs, while LEDs 22, 24 could primarily (or completely) be identical blue and red light emitting LEDs, respectively. By red, green and blue, is referenced, unless a contrary intention appears, than an integrated spectra (that is, the total area under a spectral output curve) is primarily between about 600–700 nm, 500–600 nm, and 400–500 nm, respectively. Thus, each illumination source 8a, 8b, 8c will have its own integrated spectral output different from the others. Other than for the number and type of LEDs present, each illumination source 8b, 8c is essentially identical to illumination source 8a described in connection with FIG. 2. Similarly, illumination source 8b, 8c also have corresponding interference filters 32 and 33, respectively, and respective concentrator cones 40. Interference filters 32, 33 are similar in construction to interference filter 30 except all three filters are constructed to pass only the selected different integrated spectral outputs from their respective illuminations sources 8a, 8b, 8c. Interference filters 30, 32, 33 allow for fine tuning of the integrated spectra passing down respective cones 40 as required, without changing LEDs (which are generally only of limited types, such that no combination might produce a required integrated spectral output to be sent down cones 40). Other than the different types of LEDs used, and the different spectra passed by the interference filters, each assembly of an illumination source, corresponding interference filter, and corresponding concentrator cone, is essentially the same. Unwanted spectral components can most efficiently be removed with the sharp cutoffs characteristic of thin film interference filters. This is generally done after the light has been somewhat collimated. Collimated light works most effectively with these filters due to shifts in the filter characteristics that occur with changes in incident light angle. However, most light sources do not inherently emit in a collimated beam. Lenses 18 provide a suitable degree of collimation for this purpose.

Concentrator cones 40 have their optical axis coplanar, and have their respective light outlets 43 directing light into the inside of integrating chamber 50 through respective light input ports 52, each in the same configuration as described in more detail in connection with FIG. 2. With the use of the three input ports 52, and corresponding cones and interference filters, this allows for grouping of similar LEDs. Because of this, a single filter can be applied globally to each array of LEDs 20, 22, 24. If one attempted to place all the LEDs 20, 22, 24 in one large array to be directed into a large cone and hence into integrating chamber 50, it would be difficult if not impossible to then provide an interference filter in front of such a mixed array, which will result in a required integrated spectral output being sent down such a cone.

Small LEDs are available in many wavelengths and packaging options that determine the color and forward viewing or beam angle through condensing lenses 18 of each LED. LEDs with the most directive packaging (that is, with light emitted from lenses 18 having a divergence of less than about 15 degrees), provide light which is sufficiently collimated for effective processing by dichroic interference filters. In other words, LED packaging designed for high brightness (narrow beam) when viewed by the eye, also work very well for dichroic filtration and subsequent concentration into a diffusion chamber for illuminating film.

The blue LEDs 22 use an interference filter 32 of the thin film short wave pass type with a sharp cutoff. This is effective at reflecting the longer wavelengths (such as red and green light from illumination sources 8a and 8c) that happen to pass into the blue concentrator from the integrating chamber 50. Similarly, green LEDs 20 use a band pass interference filter 30 that reflects red and blue. Finally the red LED array of illumination source 8c may use a long wave pass or band pass (if undesirable infrared energy is present) interference filter 33 to reflect the blue and green light present in the chamber. Because of this use of interference filters that reflect light, not only is the required filtration obtained but light losses from integrating chamber 50 are reduced. For example, for first light of a particular spectral distribution entering a given input port 52 the other two output ports will not be sources of light loss, since much of the first light will be reflected back off the corresponding interference filters for those two output ports, and back into integrating chamber 50. This is illustrated, for example, in the case of a beam 34a from blue LEDs 22. This beam 34a might be reflected off the inside of integrating cylinder 50 as beam 34b. Beam 34b passes back up through the concentrator 40 associated with illumination source 8a, is then reflected off interference filter 30 as reflection 34c, and then reflected back into integrating chamber 50 from concentrator 40 as reflection 34d. Although the red and blue light entering the green concentrator 40 from the integrator is diffuse, after propagating back to the filter the light has been somewhat collimated by the concentrator 40 operating in reverse of its normal mode. This effect prevents the filter cutoff from moving due to a high angle incident light.

As already mentioned, concentrators 40 are attached to the integrating chamber 50 around a plane bisecting the chamber and normal to the optical axis extending through output port 60. However, concentrators 40 may also be tilted slightly toward the output port. In order to prevent direct, non-uniform light from concentrators 40 falling on the back of the integrating chamber and being imaged, the concentrator shape may be modified into a compound parabolic cone, such as shown for example in U.S. Pat. No. 5,335,158. This reference and all other references cited herein, are incorporated in this application by reference. Alternatively, cones 40 could just have a circular cross-section along their entire length.

Furthermore, standard concentration techniques using reflective hollow cones also work most effectively when the input light is highly collimated. Again, the highly directed LED packaging allows a high concentration ratio (input to output areas) to be practical.

As already discussed, the injection of the light from any of the illumination sources 8a, 8b, 8c through respective input ports 52 and into integrating chamber 50, is done such that at least two reflections from the diffuse, interior surface of chamber 50 are required for the majority of light from each illumination source entering an input port 52, before that light can exit through output port 60 and illuminate a media to be scanned. This is useful in that the light output from a concentrator 40 is not uniformly distributed. For an area scan system, an integrating chamber is preferred. The integrating chamber 50 (sometimes referred as a diffusion chamber) is desirable to provide not only uniform illumination of the media but also uniform mixing of multiple wavelength sources within a color channel.

Referring to FIG. 5, a typical scanner using the illuminator of FIG. 3, is shown. In the scanner, only one concentrator 40 and associated illumination source 8c is shown for simplicity. Light from output port 60 of integrating chamber 50 impinges upon an image frame 112 of a transparent film 110 held over an opening in a media holder in the form of a film gate 101. This light, after having passed through image frame 112 is focussed by a lens assembly 120 onto a two-dimensional sensor, such as a typical CCD sensor (which may either be a full-frame or interline CCD sensor). Sensor 140, together with electronics section 160, provide a digital signal output corresponding to the image on image frame 112. All these components, other than the illuminator, are well known in the scanner art. In the scanning operation, typically the different illumination sources 8a, 8b, 8c would be tuned on in sequence in a known manner (that is, the different color channels of the images are scanned one after another). Alternatively, but less preferably, all three sources 8a, 8b, 8c could be turned on simultaneously. However, a color filter array or similar arrangement would then be required for sensor 140. Alternatively, the scanner can be arranged to scan an image from a reflection print, rather than from transparent film 110.

Variations and modifications to the above particularly described embodiments are, of course, possible. For example, the LEDs can be replaced with laser diodes. Such laser diodes, rather than having the integral one-piece construction of the LEDs above, have a separate light emitting section in a housing and a lens on a forward end of the housing. Again, the lens is preferably adjacent (that is, within 1 to 5 mm of the light emitting section. In this case, and also in the case of LEDs having a correct spectral distribution, filters could be eliminated. Another option is to place at least one array (and optionally a plurality of arrays) directly on the inside surface of the integrating chamber, providing filtration is not required. In this arrangement, the array can have the LEDs spaced apart, and even one array of interspersed, spaced apart LEDs of different spectral distributions, can be provided on the inside surface of the integrating chamber. In this manner, the cones can be eliminated and light losses from the integrating chamber can be substantially reduced since no light inlet openings are required. Other variations and modifications can be effected within the spirit and scope of the invention. Accordingly, the present invention is not limited to the above specifically described embodiments. It will also be appreciated that illuminators of the present invention could be used for other purposes such as printers, for example a photographic printer.

The invention has been described in detail with particular reference to certain preferred embodiments thereof, but it will be understood that variations and modifications can be effected within the spirit and scope of the invention.

PARTS LIST 2 incandescent light bulb
4 reflector
6 interference filter
8 non-imaging optic concentrator cone
8a illumination source
8b illumination source
8c illumination source
10 printed circuit board
11 input port
12 exit port
16 central portion
17 base
18 condensing convex lens
19 front
20 LEDs
22 LEDs
24 LEDs
30 interference filter
32 interference filter
33 interference filter
34a beam
34b beam
34c reflection
34c reflection
40 concentrator cone
41 light inlet end
43 light inlet end
50 integrating chamber
52 light output port
60 output port
70 position
80 higher angle light
100 circumference
101 filmgate
110 transparent film
112 image frame
120 lens assembly
140 sensor
160 electronics section

What is claimed is:

1. A scanner comprising:
(a) an illuminator comprising a plurality of illumination sources each having a different integrated spectral output;
(b) an integrating chamber to receive light from each of the illumination sources of the illuminator through respective input ports of the integrating chamber and direct it through an output port of the chamber;
(c) a plurality of interference filters each positioned between a corresponding input port of said respective input ports and an illumination source of said plurality of illumination sources;
(d) a plurality of light concentrators each positioned between a corresponding illumination source of said illumination sources and an input port of said respective input ports;

(e) a media holder to hold a media carrying an image for scanning, the media held by said media holder being positioned to receive light from the output port of the integrating chamber; and (f) a sensor positioned to receive light from the media so as to generate an image signal corresponding to an image on a media positioned at the media holder.

2. A scanner according to claim 1 wherein each interference filter is positioned on an input side of the corresponding concentrator which receives light from an illumination source of said plurality of illumination sources.

3. A scanner according to claim 1 wherein each illumination source comprises a two dimensional array of light emitting elements.

4. A scanner according to claim 3 wherein each interference filter is positioned adjacent a corresponding two dimensional array of light emitting elements.

5. A scanner according to claim 1 wherein each array of light emitting elements comprises a plurality of semiconductor light emitting elements with respective condenser lenses.

6. A scanner comprising:

(a) an illuminator comprising (i) a plurality of arrays of semiconductor light emitting elements, each one of said arrays having a different integrated spectral output; and (ii) a plurality of respective different interference filters;

(b) a plurality of light concentrators which each receive light from a respective array of light emitting elements, each of said interference filters being positioned between a corresponding array of light emitting elements and an inlet end of a corresponding light concentrator;

(c) a media holder to hold a media carrying an image for scanning, the media being positioned to receive filtered light from the illuminator; and (d) a sensor positioned to receive light from the media so as to generate an image signal corresponding to an image on a media positioned at the media holder.

7. A scanner according to claim 6 wherein each interference filter is adjacent the corresponding array.

8. A scanner according to claim 6, additionally comprising an integrator to receive filtered light from the plurality of arrays of the illuminator after said filtered light has passed through said light concentrator, and combine them for a single light output which is directed to the media holder.

9. A scanner according to claim 8 wherein the integrator comprises an integrating chamber which receives filtered light from the plurality of arrays of the illuminator, through respective input ports and provides the single light output.

10. A scanner according to claim 9 wherein the integrating chamber provides at least two diffuse light reflections for the majority of light from each input port before exiting the output port.

11. A scanner according to claim 6 wherein the semiconductor light emitting elements of the arrays include a condenser lens.

12. An illuminator, comprising:

(a) a plurality of illumination source each having a different integrated spectral output, each of said illumination sources comprising a two-dimensional array of light emitting elements;

(b) an integrating chamber to receive light from each of the illumination sources through respective input ports of said integrating chamber, and direct it through an output port of the chamber; and (c) a plurality of interference filters, each of said filters being positioned between a corresponding input port of said respective input ports and an illumination source of said illumination sources.

13. An illumination source according to claim 12 wherein the interference filters are positioned adjacent a respective illumination source of said plurality of illumination sources.

14. An illuminator, comprising:

(a) a plurality of illumination sources comprising respective two-dimensional arrays of light emitting elements, each one of said arrays having a different integrated spectral output;

(b) a plurality of light concentrators which receive light from a corresponding illumination source; and (c) an integrating chamber to receive light from each of the illumination sources after said light has passed through said light concentrators, said integrating chamber directing said light through an output port of the chamber.

15. An illuminator according to claim 14 wherein at least one of the illumination sources additionally comprises a filter positioned between the array of the illumination source and the integrating chamber.

16. A scanner comprising:

(a) an illuminator comprising a plurality of illumination sources each having a different integrated spectral output;

(b) an integrating chamber to receive light from each of the illumination sources of the illuminator through respective input ports of said integrating chamber and direct it through an output port of the chamber.

(c) a plurality of interference filters each positioned between a corresponding input port of said respective input ports and an illumination source of said illumination sources;

(d) a media holder to hold a media carrying an image for scanning, the media being positioned to receive light from the output port of the integrating chamber; and (e) a sensor positioned to receive light from media positioned at said media holder so as to generate an image signal corresponding to an image on the media positioned at the media holder.

17. A scanner according to claim 16 wherein the interference filters are positioned adjacent a respective illumination source of said plurality of illumination sources.

18. A scanner according to claim 16 wherein each illumination source comprises a two-dimensional array of light emitting elements.

19. An illuminator comprising:

(a) a plurality of illumination sources each having a different integrated spectral output;

(b) an integrating chamber to receive light from each of the illumination sources through respective input ports of the integrating chamber and direct it through an output port of the chamber;

(c) a plurality of interference filters each positioned between a corresponding input port of said respective input ports and an illumination source of said plurality of illumination sources; and (d) a plurality of light concentrators each positioned between a corresponding illumination source of said plurality of illumination sources and a corresponding input port of said respective input ports.

20. An illuminator according to claim 19 wherein each interference filter is positioned on an input side of the corresponding concentrator which receives light from an illumination source of said plurality of illumination sources.

21. An illuminator according to claim 19 wherein each illumination source comprises a two-dimensional array of light emitting elements.

22. An illuminator according to claim 21 wherein each two-dimensional array of light emitting elements comprises a plurality of semiconductor light emitting elements with respective condenser lenses.

23. An illuminator comprising:
   (a) a plurality of illumination sources comprising respective arrays of two-dimensional arrays of light emitting elements, each of said arrays having a different integrated spectral output;
   (b) an integrating chamber to receive light from each of the illumination sources, the integrating chamber having a light output port; and
   (c) a plurality of light concentrators each positioned between a corresponding illumination source and the integrating chamber.

24. An illuminator according to claim 23 wherein the integrating chamber receives light from each of the illumination sources through respective light input ports of the integrating chamber, and the light concentrators direct light into the respective input ports of the integrating chamber.

25. An illuminator comprising:
   a plurality of illumination sources each having a different integrated spectral output;
   a plurality of interference filters each positioned adjacent to a respective illumination source;
   a plurality of light concentrators which respectively receive filtered light from a respective corresponding illumination source, each of said light concentrators having an input end for receiving said filtered light, said input end of each of said light concentrators being located adjacent to a respective one of said interference filters; and
   an integrating chamber which receives said light from said light concentrators, said integrating chamber having a plurality of input ports which are located adjacent to corresponding output ends of said light concentrators, said integrating chamber leading said light from said plurality of input ports to a single output port.

26. An illuminator according to claim 15, wherein said interference filters, said light concentrators and said integrating chamber provide reflective surfaces for at least two light reflections for a majority of light which enters the input ends of said light reflectors and exits said single output port of said integrating chamber.

27. An illuminator according to claim 25, wherein each of said light concentrators define a compound elliptical configuration.

28. An illuminator according to claim 25, wherein the inlet end of each of said light concentrators defines an elliptical shape, a mid-portion of each of said light concentrators defines a circular shape, and the outlet end of each of said light concentrators defines an elliptical shape.

* * * * *